Dec. 24, 1957  C. B. STEVENS  2,817,539
CHILD'S TRICYCLE
Filed Aug. 30, 1955

INVENTOR
CLIFFORD BROOKS STEVENS
BY
ATTORNEY

United States Patent Office 2,817,539
Patented Dec. 24, 1957

2,817,539

CHILD'S TRICYCLE

Clifford Brooks Stevens, Milwaukee, Wis., assignor, by mesne assignments, to American Machine & Foundry Company, New York, N. Y., a corporation of New Jersey Application August 30, 1955, Serial No. 531,427

3 Claims. (Cl. 280—282)

This invention relates to children's tricycles.

It is an object of this invention to provide a tricycle which will be of lightweight construction, so that it may be readily carried up and down stairs and will be easier to operate.

A further object is to provide a tricycle wherein individually mounted rear wheels are connected to the overhung frame to provide a semi-rigid mounting to help absorb shock when running over obstacles and make for softer riding.

Another object is to provide a tricycle which will have the wheels located inside the framework so that the rotating hubs will be located on the inside of the covering framework.

A further object is to provide a tricycle that has the appearance of a harness racing sulky with a canted, overhung arch for mounting the individual rear wheel axles.

A further object is to provide swingable mounting stirrups on the arch.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
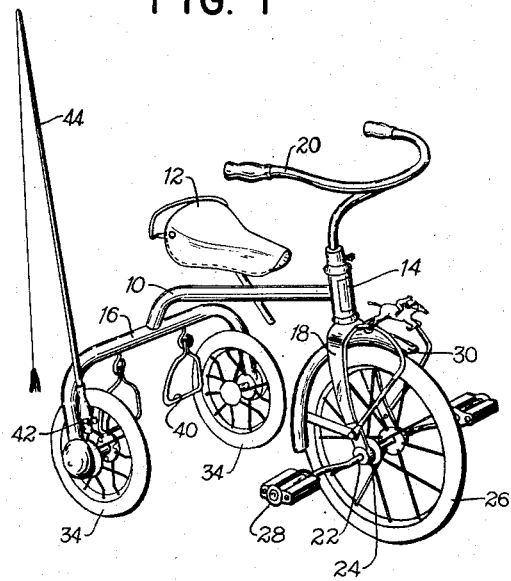
Fig. 1 is a perspective view of the tricycle.
Figure 2:
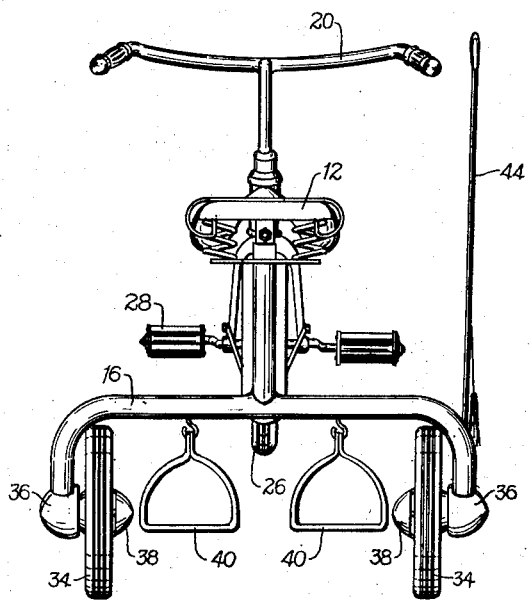
Fig. 2 is a rear view of the tricycle.

The invention consists of a tricycle having a cross bar 10 to which a saddle 12 is secured by suitable means. The cross bar 10 is connected at one end to the headpost 14 and at the other end to the overhung arch 16. A conventional front fork 18 is pivotally mounted in the headpost 14 and has a handle bar 20 fixed to the upper end thereof. A pedal driven shaft 22 is supported at the lower ends 24 of the fork 18. A wheel 26 is fixedly connected to the saddle shaft 22 so that when the pedals 28 are actuated it causes the wheel 26 to rotate in the bearings of the lower end of the fork 24. A suitable mudguard 30 is connected to the front fork in a manner well known in the art.

The rear arch 16 is canted forward and stud shafts 32 projecting inwardly from the lower ends of the arch 16. Wheels 34 are rotatably mounted on the inwardly projecting stud shafts 32 and are supported thereon by any suitable means such as a washer and cotter pin or by a nut.

Suitable caps 36 cover the lower ends of arch 16 and prevent serious injury or damage if the user of the tricycle should inadvertently bumb into an object or another child. The inside end of the wheel 34 is covered by hub caps 38.

Mounting stirrups 40 are swingably secured to the under side of the canted arch 16. On one side of the arch is provided a holder 42 which supports the lower end of a suitable whip 44.

In the embodiment of the invention I have used to illustrate the invention, the rear wheels are supported in an overhung arch 16 which provides a semi-rigid mounting which helps absorb shock when running over obstacles which makes for a softer ride. Also, by covering the rear wheels with the overhung arch 16 there is less likelihood for a child's being seriously injured if bumped by the tricycle described herein. Any normal bumps that result from the usual operation of the tricycle are absorbed by the hub caps and arch 16.

The stirrups 40 have the advantage that they give a user the feeling of riding a sulky, which makes for more interest in using a tricycle instead of the usual standard steps found in a conventional tricycle. Of course, if desired, an interconnected single shaft could be used instead of the two stud shafts shown, and conventional standing steps could be suported on the single shaft instead of the swingable mounting stirrups.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A child's tricycle comprising a cross bar, a headpost connected to one end of said cross bar, a front fork and wheel pivotally mounted in said headpost, an overhung arch connected to the rear end of said cross bar, individual stud shafts projecting inwardly from the lower end of said overhung arch and supported on one end only, and individual rear wheels mounted on each of said axles.

2. A child's tricycle comprising a horizontal cross bar, a two legged rear arch connected to one end of said cross bar, a headpost connected to the other end of said cross bar, a front wheel pivotally mounted in said headpost, a pair of stud shafts projecting inwardly from the legs of said rear arch and supported at one end only, a pair of rear wheels mounted on said stud shafts and a pair of stirrups swingably mounted on the under side of said rear arch.

3. A child's tricycle comprising a cross bar, a wide inverted U shaped arch connected to one end of said cross bar, and having the legs thereof projecting downwardly, stud shafts projecting inwardly from the ends of said legs, and supported at one end only and a pair of wheels mounted on said stud shafts inside of said overhung arch.

References Cited in the file of this patent

UNITED STATES PATENTS

| D. 169,640 | Schreckengost | May 19, 1953 |
| 1,094,413 | Bagley | Apr. 28, 1914 |
| 1,286,294 | Griswold | Dec. 3, 1918 |
| 1,395,552 | Bridges | Nov. 1, 1921 |
| 1,854,337 | Kraeft | Apr. 19, 1932 |
| 1,933,955 | Arnold | Nov. 7, 1933 |
| 1,979,861 | Bullock | Nov. 6, 1934 |
| 2,545,231 | Glumer et al. | Mar. 31, 1951 |